(12) United States Patent
Reinke et al.

(10) Patent No.: US 10,055,998 B1
(45) Date of Patent: Aug. 21, 2018

(54) GROUND-BASED IDENTIFICATION OF WAKE TURBULENCE ENCOUNTERS

(71) Applicants: Airbus Operations (S.A.S.), Toulouse (FR); Airbus (S.A.S.)

(72) Inventors: Andreas Reinke, Le Castera (FR); Sebastian Kauertz, Toulouse (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 0 days.

(21) Appl. No.: 15/687,139

(22) Filed: Aug. 25, 2017

(51) Int. Cl.
G08G 1/00 (2006.01)
G08G 5/00 (2006.01)

(52) U.S. Cl.
CPC ......... G08G 5/0013 (2013.01); G08G 5/0026 (2013.01)

(58) Field of Classification Search
CPC ............................ G08G 5/0013; G08G 5/0026
See application file for complete search history.

(56) References Cited

U.S. PATENT DOCUMENTS

| | | | |
|---|---|---|---|
| 5,657,009 A | 8/1997 | Gordon | |
| 5,724,040 A | 3/1998 | Watnick | |
| 5,845,874 A | 12/1998 | Beasley | |
| 6,177,888 B1* | 1/2001 | Cabot | G01C 23/00 340/968 |
| 6,381,538 B1 | 4/2002 | Robinson et al. | |
| 6,650,972 B1 | 11/2003 | Robinson et al. | |
| 6,917,860 B1 | 7/2005 | Robinson et al. | |
| 6,963,291 B2 | 11/2005 | Holforty et al. | |
| 7,333,030 B2 | 2/2008 | Baranov et al. | |
| 7,463,955 B1 | 12/2008 | Robinson et al. | |

(Continued)

FOREIGN PATENT DOCUMENTS

| | | |
|---|---|---|
| AU | 2003301511 A1 | 2/2005 |
| CA | 2536671 A1 | 2/2005 |

(Continued)

OTHER PUBLICATIONS

ATR—AeroTech Research (U.S.A.), Inc., "In Situ Wake Vortex Encounter Detection and Reporting System (VEDARS)," www.atr-usa.com, p. 1, dated Jun. 23, 2017.

(Continued)

*Primary Examiner* — Erin M File
(74) *Attorney, Agent, or Firm* — Jenkins, Wilson, Taylor & Hunt, P.A.

(57) ABSTRACT

A ground-based server is configured for identifying encounters of aircraft with wake turbulences generated by at least one other generating aircraft. The ground-based server is configured for: collecting avionics data for an in-flight aircraft and traffic data for one or more other aircraft in flight at a first flight time of the in-flight aircraft; determining that the in-flight aircraft was near a wake turbulence estimated, using the traffic data, to be generated by another aircraft; determining that the in-flight aircraft experienced at the first flight time a severe impact; determining that the in-flight aircraft experienced at the first flight time at least one of: one or more uncommanded forces and moments, and a wind signature indicative of wake turbulence; and in response, generating a report of a wake turbulence encounter for the in-flight aircraft at the first flight time.

17 Claims, 6 Drawing Sheets

(56) References Cited

U.S. PATENT DOCUMENTS

| | | | |
|---|---|---|---|
| 7,471,995 | B1 | 12/2008 | Robinson |
| 7,686,253 | B2 | 3/2010 | Lewis et al. |
| 7,765,090 | B2 | 7/2010 | Nakayama et al. |
| 8,000,848 | B2 | 8/2011 | Baranov et al. |
| 8,131,407 | B1 | 3/2012 | Robinson |
| 8,135,500 | B1 | 3/2012 | Robinson |
| 8,376,284 | B2 | 2/2013 | Lewis et al. |
| 8,478,459 | B2 | 7/2013 | Mutuel et al. |
| 8,949,014 | B2 | 2/2015 | Bateman et al. |
| 9,037,319 | B2 | 5/2015 | Conner et al. |
| 9,047,770 | B2 * | 6/2015 | Lafon .................... G08G 5/065 |
| 9,824,593 | B1 * | 11/2017 | Kronfeld ............. G08G 5/0043 |
| 2002/0075171 | A1 | 6/2002 | Kuntman et al. |
| 2002/0171563 | A1 | 11/2002 | Djorup |
| 2003/0222795 | A1 * | 12/2003 | Holforty ................ B64D 43/00 340/968 |
| 2006/0244637 | A1 | 11/2006 | Baranov et al. |
| 2007/0103340 | A1 | 5/2007 | Baranov et al. |
| 2007/0294066 | A1 | 12/2007 | Nakayama et al. |
| 2008/0030375 | A1 | 2/2008 | Cotton et al. |
| 2008/0035784 | A1 | 2/2008 | Meserole et al. |
| 2008/0035789 | A1 | 2/2008 | Lewis et al. |
| 2010/0277347 | A1 * | 11/2010 | Judd .................... G08G 5/0013 340/945 |
| 2010/0283635 | A1 * | 11/2010 | Brinkman ............. G01C 23/00 340/961 |
| 2011/0004398 | A1 | 1/2011 | Stayton et al. |
| 2011/0270992 | A1 * | 11/2011 | Judd .................... G08G 5/0013 709/227 |
| 2012/0054641 | A1 * | 3/2012 | Sae-Chim ............ G06F 3/0489 715/752 |
| 2013/0080043 | A1 * | 3/2013 | Ballin .................. G08G 5/0034 701/120 |
| 2014/0136110 | A1 | 5/2014 | Nykl et al. |
| 2015/0235559 | A1 | 8/2015 | Alekseev et al. |
| 2016/0328981 | A1 * | 11/2016 | Herder ................ G08G 5/0021 |
| 2017/0006619 | A1 * | 1/2017 | Papp .................... H04W 72/10 |
| 2017/0337822 | A1 | 11/2017 | Reinke et al. |

FOREIGN PATENT DOCUMENTS

| | | | |
|---|---|---|---|
| CN | 1906501 | A | 1/2007 |
| CN | 101501595 | A | 8/2009 |
| CN | 1906501 | B | 5/2010 |
| DE | 10039109 | A1 | 2/2002 |
| EA | 008091 | B1 | 2/2007 |
| EA | 008093 | B1 | 2/2007 |
| EP | 1653250 | A1 | 5/2006 |
| EP | 1653250 | A4 | 9/2007 |
| EP | 2076826 | A2 | 7/2009 |
| KR | 20090048579 | A | 5/2009 |
| RU | 2007/131794 | A | 2/2009 |
| RU | 2012109080 | A | 9/2013 |
| RU | 2496121 | C1 | 10/2013 |
| WO | WO 2005010555 | A1 | 2/2005 |
| WO | WO 2007115359 | A1 | 10/2007 |
| WO | WO 2008002675 | A2 | 1/2008 |
| WO | WO 2008002675 | A3 | 4/2008 |
| WO | WO 2009/029005 | A2 | 3/2009 |

OTHER PUBLICATIONS

Berdahl, et al., "Eduction of Swirling Structure Using the Velocity Gradient Tensor," AIAA 22nd Fluid Dynamcs, Plasma Dynamics & Lasers Conference, XX, XX, vol. 91, pp. 1823-1—1823-12, XP002994423, dated Jun. 1, 1991.

Berdahl, et al., "Eduction of Swirling Structure Using the Velocity Gradient Tensor," AIAA Journal, vol. 31, No. 1, pp. 97-103, dated Jan. 1993.

ICAO, "Collection of Information on wake vortex encounters," AN 13/4-07/67, pp. 1-6, dated Oct. 26, 2007.

Cucitore, et al., "On the effectiveness and limitations of local criteria for the identification of a vortex," European Journal of Mechanics B. Fluids, Gauthier-Villars, Paris, France, vol. 18, No. 2, pp. 261-282, XP022553555, ISSN: 0997-7546, dated Mar. 1, 1999.

French Search Report for Application No. 1654482 dated Sep. 22, 2016.

Reinke, "Wake encounter severity metrics as input to monitoring requirement," WN3-E Specific Workshop on "Incident and accident monitoring and analysis," NLR, Amsterdam, pp. 1-15, dated Nov. 18, 2010.

\* cited by examiner

GROUND-BASED IDENTIFICATION OF WAKE TURBULENCE ENCOUNTERS

TECHNICAL FIELD

The present disclosure relates to ground-based systems and methods for automatic identification and reporting of wake turbulence encounters by aircraft.

BACKGROUND

In the context of aeronautical navigation, each aircraft can be subjected to turbulences which arise from the atmospheric environment or from other aircraft.

When in flight, an aircraft generates a vortex behind each wing. When another aircraft encounters one of these wake turbulences, its flight behavior is disturbed. The data relative to these encounters with wake turbulences are not regularly or optimally collected. In fact these data are generally collected by the pilots either in a succinct manner, or after the event, which gives a set of piecemeal data which does not allow a rigorous and complete study.

SUMMARY

A purpose of the subject matter herein is to disclose methods and systems for identifying encounters of aircraft with wake turbulences generated by at least one other generating aircraft.

In some examples, a ground-based server comprises: at least one processor and memory storing executable instructions for the at least one processor; and a wake turbulence analyzer implemented on the at least one processor and memory and configured for: collecting avionics data for an in-flight aircraft and traffic data for one or more other aircraft in flight at a first flight time of the in-flight aircraft; determining that the in-flight aircraft was within a threshold distance of at least a first position of a wake turbulence estimated, using the traffic data, to be generated by another aircraft; determining that the in-flight aircraft experienced at the first flight time an impact having a severity level exceeding a threshold; determining that the in-flight aircraft experienced at the first flight time at least one of: one or more uncommanded forces and moments, and a wind signature indicative of wake turbulence; and generating a report of a wake turbulence encounter for the in-flight aircraft at the first flight time in response to: determining that the in-flight aircraft was within the threshold distance, determining that the in-flight aircraft experienced the impact, and determining that the in-flight aircraft experienced at least one of the one or more uncommanded forces and moments and the wind signature.

In some examples, the wake turbulence analyzer is configured for collecting additional avionics data for a fleet of aircraft over a window of time and additional traffic data for the window of time and generating a plurality of wake turbulence reports for the fleet of aircraft over the window of time. In some examples, collecting avionics data for the in-flight aircraft comprises communicating with an on-board avionics computer system of the in-flight aircraft during or after the first flight time.

Collecting the traffic data for the one or more other aircraft can include communicating with an on-board avionics computer system of the in-flight aircraft during or after the first flight time, wherein the on-board avionics computer system is configured to record air-to-air data link messages from the one or more other aircraft when the other aircraft are within a vicinity of the in-flight aircraft. Collecting the traffic data can include measuring the traffic data using a ground-based measurement system. Collecting the traffic data can include requesting the traffic data from an external data server.

The disclosure herein also discloses methods and computer readable media for identifying encounters of aircraft with wake turbulences generated by at least one other generating aircraft.

BRIEF DESCRIPTION OF THE DRAWINGS

The features of the disclosure herein mentioned above, as well as others, will appear more clearly on reading the following description of an example embodiment, the description being given with reference to the appended example drawings, among which.

DETAILED DESCRIPTION

Figure 1:
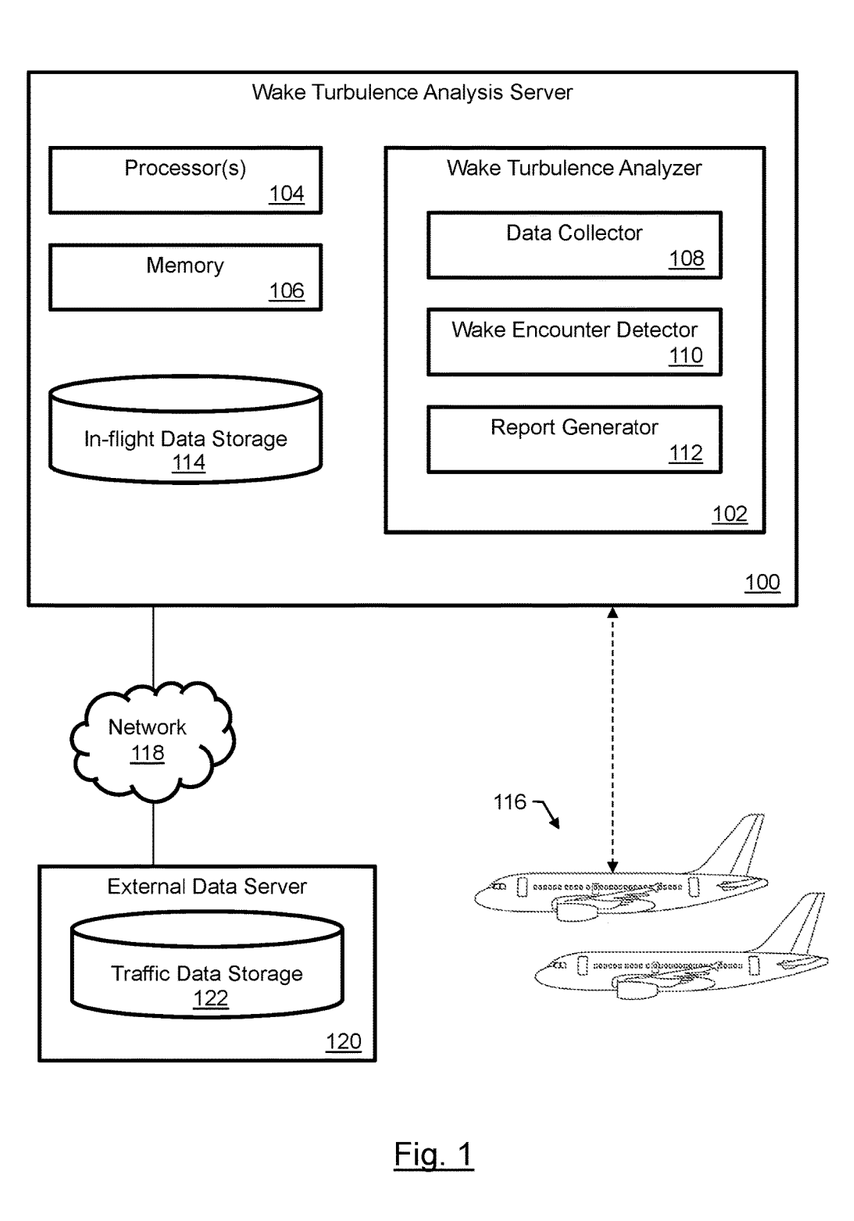
FIG. 1 is a block diagram of an example ground-based wake turbulence analysis server for identifying a wake turbulence generated by at least one generating aircraft.

FIG. 1 is a block diagram of an example ground-based wake turbulence analysis server 100 for identifying encounters of aircraft with wake turbulences generated by at least one generating aircraft.

Generally, the wake turbulence analysis server 100 can be configured to perform one or more of the following tasks:

Identify the occurrence of wake turbulence encounters in data recorded by a fleet of aircraft.

Quantify the severity of the identified wake turbulence encounters based on the impact on the encountering aircraft.

Assemble relevant information regarding the occurrences, their circumstances and consequences for later analysis.

Disseminate information regarding the occurrences, their circumstances and consequences to relevant actors, such as for example Airline Operation Centre (AOC), Air Traffic Control (ATC), flight crew or aircraft manufacturer, immediately or at a later time.

The wake turbulence analysis server 100 can use, for example, the following criteria to identify wake turbulence encounters:

The encountering aircraft has to be located relative to a trailing wake vortex such that a wake encounter is likely. This can be determined e.g. using current and past position reports from surrounding traffic received via air-to-air data link (such as ADS-B) or radar surveillance data in conjunction with a wake transport model, or by directly measuring the wake vortex position relative to the aircraft when appropriate equipment is available; and Uncommanded aircraft movements due to external forces and moments have to be experienced by the encountering aircraft of a magnitude and duration typical for a passage through a wake vortex; or The wind components measured on-board the encountering aircraft have to exhibit characteristic variations typical of wake vortex encounters.

Additionally the severity of the wake for the encountering aircraft can be determined and used as a criterion to decide if a wake encounter report is created or not.

In operation, the wake turbulence analysis server 100 can estimate the location of wakes created by surrounding traffic. Since the identification of a wake encounter from external forces & moments or wind signatures alone may be ambiguous and may lead to a number of spurious detections, the wake location prediction provides an independent criterion that improves the reliability of the identification.

In general, if there is no traffic in the vicinity that could have generated a wake that is close enough to the surveyed aircraft at the instant of a potential wake encounter identification, a wake encounter can be ruled-out. An identification based on external forces and moments or wind signatures is then most likely due to other phenomena such as atmospheric gusts or turbulence. The proximity of a wake generated by another aircraft is thus a useful condition to confirm a wake encounter identification by one or both of the two other criteria.

Once a wake turbulence encounter has been identified, its severity can be assessed by quantifying the impact on the surveyed aircraft. The severity may reflect aspects including unusual aircraft attitude, loss of aircraft attitude control, deviation from intended flight path, exceedances of normal aerodynamic envelope, large structural loads and/or large accelerations within the cabin. In some examples, relevant data may also be stored within the occurrence report such that the severity can be evaluated afterwards, without an immediate assessment of severity.

In some examples, the wake turbulence analysis server 100 stores all information relevant to the wake encounter occurrence. This stored data can later be retrieved for further analysis. In some examples, the wake turbulence analysis server 100 may include further software tools for analysis of individual events as well as for the statistical analysis of multiple wake encounter events. Additionally the reports created by the wake turbulence analysis server 100 may be transmitted automatically to other actors, such as the Airline, Air Traffic Control, Air Navigation Service Providers, Regulatory Authorities or an aircraft manufacturer.

The wake turbulence analysis server 100 includes one or more processors 104 and memory 106 storing executable instructions for the processors 104. The wake turbulence analysis server 100 includes a wake turbulence analyzer 102 implemented on the processors 104 and memory 106. The wake turbulence analyzer 102 includes a data collector 108, a wake encounter detector 110, and a report generator 112.

The data collector 108 is configured for collecting avionics data for at least one in-flight aircraft and traffic data for one or more other aircraft, e.g., aircraft in flight at a first flight time of the in-flight aircraft. In some examples, the data collector 108 is configured for collecting avionics data from a whole fleet of aircraft 116 and traffic data for each of the aircraft in the fleet 116 over a window of time. The data collector 108 can store the avionics data in an in-flight data storage repository 114.

The avionics data can include, e.g., the data described below with reference to FIGS. 2-6 for identifying wake turbulence encounters. Collecting avionics data for the in-flight aircraft can include communicating with an on-board avionics computer system of the in-flight aircraft during or after the first flight time.

Collecting the traffic data can include communicating with an on-board avionics computer system of the in-flight aircraft during or after the first flight time. For example, some aircraft include an on-board avionics computer system that is configured to record air-to-air data link messages from other aircraft when the other aircraft are within the vicinity of the aircraft. Alternatively, collecting the traffic data can include recording the traffic data using a ground-based reception system.

In some examples, collecting the traffic data includes requesting the traffic data from an external data server 120 over a data communications network 118 and receiving the traffic data from traffic data storage 122 on the external data server 120. The external data server 120 may, for example, collect ADS-B data received on ground by private contributors from various sources, or collect radar surveillance data from air traffic control organizations.

The wake encounter detector 110 is configured for determining that the in-flight aircraft was within a threshold distance of at least a first position of a wake turbulence estimated, using the traffic data, to be generated by another aircraft. The wake encounter detector 110 is further configured for determining that the in-flight aircraft experienced at the first flight time an impact having a severity level exceeding a threshold and at least one of: one or more uncommanded forces and moments, and a wind signature indicative of wake turbulence. The wake encounter detector 110 is described further below with reference to FIG. 2.

The report generator 112 is configured for generating a report in response to the wake encounter detector detecting a wake turbulence encounter. The report can include, e.g., portions of the avionics data and the traffic data that were used by the wake encounter detector 110 in detecting the wake turbulence encounter.

The wake turbulence analyzer 102 may provide one or more of the following advantages over some conventional systems:

The wake turbulence analyzer 102 may use objective, validated criteria to detect and qualify a wake encounter and eliminates the potential for human error in wake encounter reports.

The wake turbulence analyzer 102 has access to additional data usually not available from Flight Data Recorders, typically traffic data received via ADS-B In, thus allowing to provide a complete picture of the circumstances leading to the encounter.

The detection and transmission of wake encounter reports is automated and does not require human intervention to recover and analyze the data.

The wake turbulence analyzer 102 may potentially cover a large part of the aircraft fleet, and more importantly, the number of aircraft covered by the function is known, allowing more precise statistical analyses.

Figure 2:
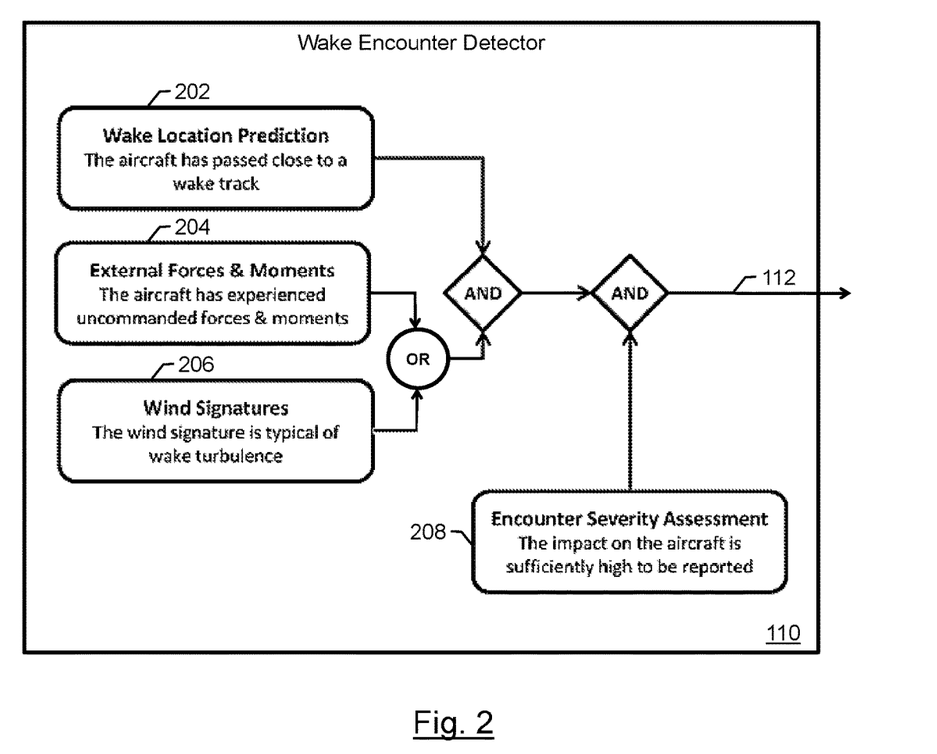
FIG. 2 is a block diagram of an example wake encounter detector.

FIG. 2 is a block diagram of an example wake encounter detector 110. The wake encounter detector 110 is configured to determine a wake location prediction 202. The wake encounter detector 110 determines whether an aircraft has passed close (within a threshold distance) to a wake track, e.g., as described below with reference to FIGS. 3-6. If the aircraft is not passing close to a wake track at certain times, then the wake encounter detector will not output an indication of a wake encounter at those times, which is useful in distinguishing wake encounters from other disturbances.

The wake encounter detector 110 can be configured to determine one or more external forces and moments 204 and determine whether the aircraft has experienced uncommanded forces and moments, e.g., as described above with reference to FIGS. 3-6. The wake encounter detector 110 can also be configured to determine a wind signature 206 experienced by an aircraft and determine whether the wind signature is typical of wake turbulence, e.g., as described above with reference to FIGS. 3-6. The wake encounter detector 110 will not output an indication of a wake encounter at times when neither the external forces and moments 204 and the wind signature indicates a wake encounter, i.e., one or both must indicate a wake encounter.

The wake encounter detector 110 can be configured to perform an encounter severity assessment 208 by determining a severity level of an impact and determining whether the severity level is sufficiently high to be reported (exceeding a threshold severity level), e.g., as described above with reference to FIGS. 3-6. At times when the wake encounter detector 110 determines that the aircraft has passed close to wake track, at least one of external forces and moments and a wind signature indicates a wake encounter, and the severity level is sufficiently high, the wake encounter detector 110 outputs an indication 112 of a wake encounter.

Figure 3:
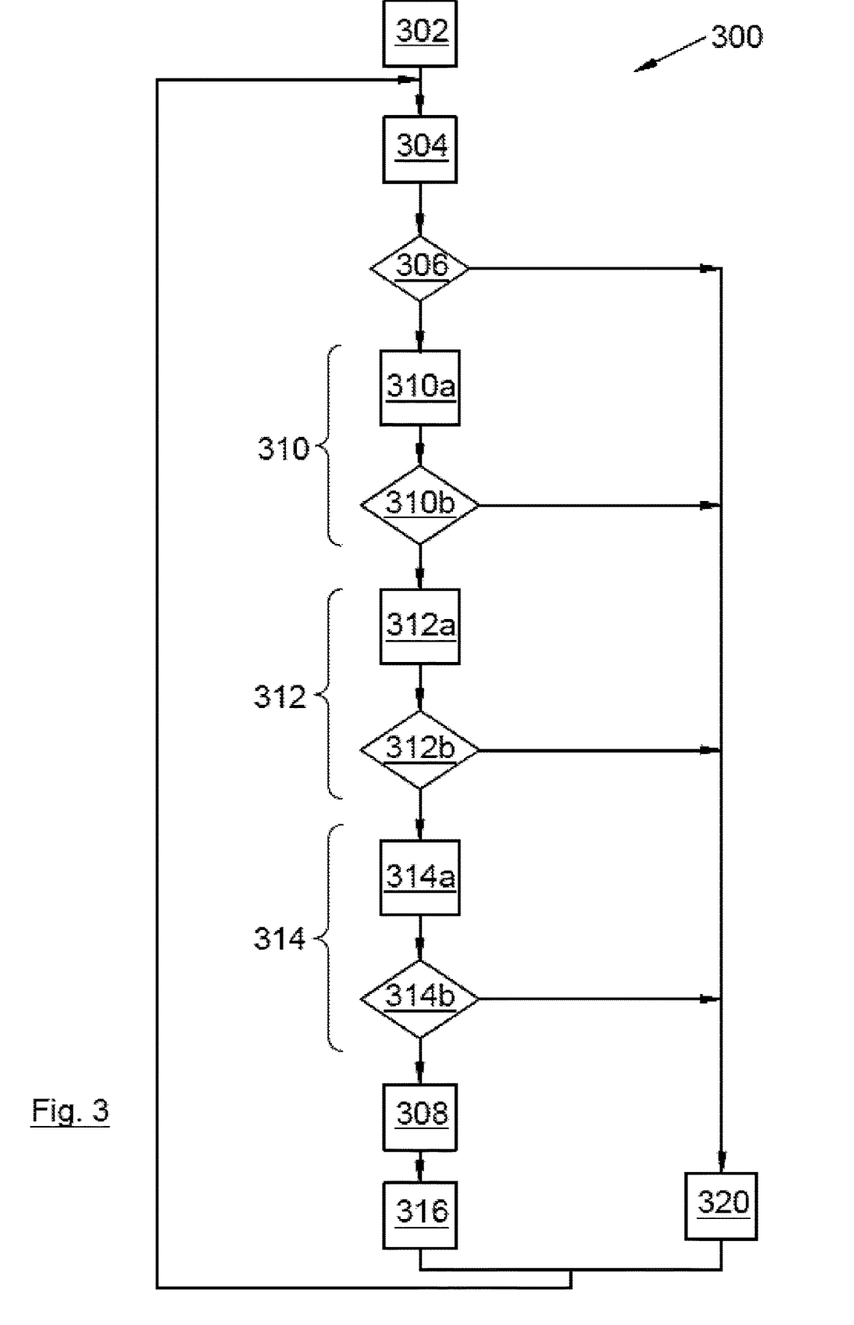
FIG. 3 is an algorithm of a method according to an embodiment of the disclosure herein and which makes it possible to identify the proximity of a wake turbulence and to generate a report relative to that proximity.

FIG. 3 shows a flow diagram of a method 300 which makes it possible to identify the proximity of a wake turbulence and to generate a report relative to that proximity. This method can be implemented by the wake turbulence analyzer 102 of FIG. 1.

As an example, the method 300 comprises:
- a data acquisition step 302 during which the wake turbulence analyzer 102 retrieves and records avionics data for an aircraft;
- a position estimation step 304 during which the wake turbulence analyzer 102 estimates the position of the wake turbulences generated by each surrounding generating aircraft;
- a proximity step 306 during which the wake turbulence analyzer 102 determines if the aircraft is close to one of the wake turbulences whose positions have thus been estimated; and
- a generation step 308 during which the wake turbulence analyzer 102 generates a report containing the data relative to each wake turbulence which has been considered as being close.

The generation step 308 is carried out if the proximity step 306 has made it possible to assure that the aircraft is close to at least one wake turbulence. In other words, during the proximity step 306, the wake turbulence analyzer 102 checks if the aircraft is in the vicinity of a wake turbulence and, in the positive case, it generates the report during the generation step 308 and, in the negative case, the method 300 moves on to a stop step 320.

During the acquisition step 302, the data are received by the wake turbulence analyzer 102. The data are acquired for example via a monitoring system of the ADS-B type on the aircraft and transmitted to the wake turbulence analyzer 102. The monitoring system on the aircraft receives the data from each surrounding generating aircraft which repetitively transmits its latitude, its longitude and its altitude. The data relative to the speed and the direction of the wind, to the true airspeed and to the true heading can also be transmitted. The wake turbulence analyzer 102 associates each item of data with a surrounding generating aircraft.

During the position estimation step 304, the wake turbulence analyzer 102 estimates, for each surrounding generating aircraft, the probable position of the wake turbulences generated by the generating aircraft by using its past and present positions, as well as the wind measured on the aircraft, or transmitted via an air-to-air transmission link from the generating aircraft, or received from an external data source.

According to a particular embodiment, the wake turbulence analyzer 102 uses these data for computing the average position of a central line of the wake turbulences generated by each surrounding generating aircraft at a particular time. The horizontal position is computed from the current position of the generating aircraft and preferably from several of its preceding positions and from the horizontal speed of the wind. The current horizontal position of the wake turbulence created by the generating aircraft when it was in a preceding position is computed as a function of the average speed of the wind and the time since the passage of the generating aircraft through the preceding position in question. The central line of the wake turbulences corresponds to the set of segments step by step connecting all of these successively computed horizontal positions. The central line of the wake turbulences can be non-linear, for example as a result of maneuvers of the generating aircraft and/or of variations of the wind.

The vertical position of the wake turbulences is computed by making assumptions regarding the maximum and minimum distance of descent at the end of the lifetime of the wake turbulences, which are for example −1000 feet and 0 feet respectively. The average position of the central line is thus considered as being at −500 feet or about 150 m below the trajectory of the generating aircraft at the end of the lifetime of the wake turbulences. For a lifetime of the wake turbulences of 180 seconds, an average descent speed of −0.83 m/s is used for computing the average altitude of the wake turbulences at any distance behind the generating aircraft 150.

According to another particular embodiment, more sophisticated models for the evaluation of the current average position of the wake turbulences can be used, like the P2P, APA or PVM probabilistic wake prediction models.

The following description is an example of implementation in which, after the determination of the central line of the wake turbulences, the wake turbulence analyzer 102 determines, during the position estimation step 304, a volume in which the wake turbulences of a generating aircraft whose effects are likely to influence the behavior of the aircraft are present is estimated. After the determination of this volume, the wake turbulence analyzer 102 determines, during the proximity step 306, the presence or not of the aircraft in the volume, which qualifies or not the wake turbulences of the generating aircraft for being mentioned in the report.

The determination of the volume can be based on an evaluation of the uncertainty in the position of the wake turbulences. In the horizontal position, the uncertainty is dependent on the accuracy of the speed of the wind which is used for computing the displacement of the wake turbulences starting from the trajectory of the generating aircraft and on the uncertainty of the position of the generating aircraft.

Typically, the uncertainty in the onboard measurements of wind speed is of the order of a standard deviation of $\sigma_w=2$ m/s. When the measurement of the speed of the wind is only available from the aircraft and not at the position of wake generation, an addition of a supplementary uncertainty of 1 m/s results in $\sigma_w$=3 m/s. The horizontal wake position uncertainty is considered as increasing linearly from the actual position of the generating aircraft to the position 180 seconds behind it. To this can be added a constant uncertainty of the positions reported by the generating aircraft. An analysis of the data of the ADS-B system shows that for a majority of commercial aircraft, this uncertainty is below $\sigma_f$=±0.1N M or $\sigma_f$=±185 m.

In the vertical direction, the uncertainty in the descent of the wake turbulences can be considered as being 0 m at 0 seconds and ±150 m after 180 seconds. To this can be added a typical uncertainty in the altitude reported by the generating aircraft and considered as $\Delta z_0$=±50 m irrespective of the age of the wake turbulences.

A condition for the horizontal distance $\Delta y_c$ to the central line of the wake turbulences as a function of the age $\Delta t$ of the wake turbulences of the closest point along the central line can be formulated as follows, considering a standard deviation of $\sigma_w$ for the speed of the wind:

$$\Delta y_c < 185 \text{ m} + \sigma_w \cdot \Delta t.$$

In order to take account of more uncertainty in the position of the wake turbulences, the condition can take account of two or three standard deviations of the speed of the wind.

A condition for the vertical distance $\Delta z_c$ to the central line of the wake turbulences can be formulated as follows:

$$|\Delta z_c| < 50m + \frac{150m}{108s} \cdot \Delta t.$$

Figure 4:
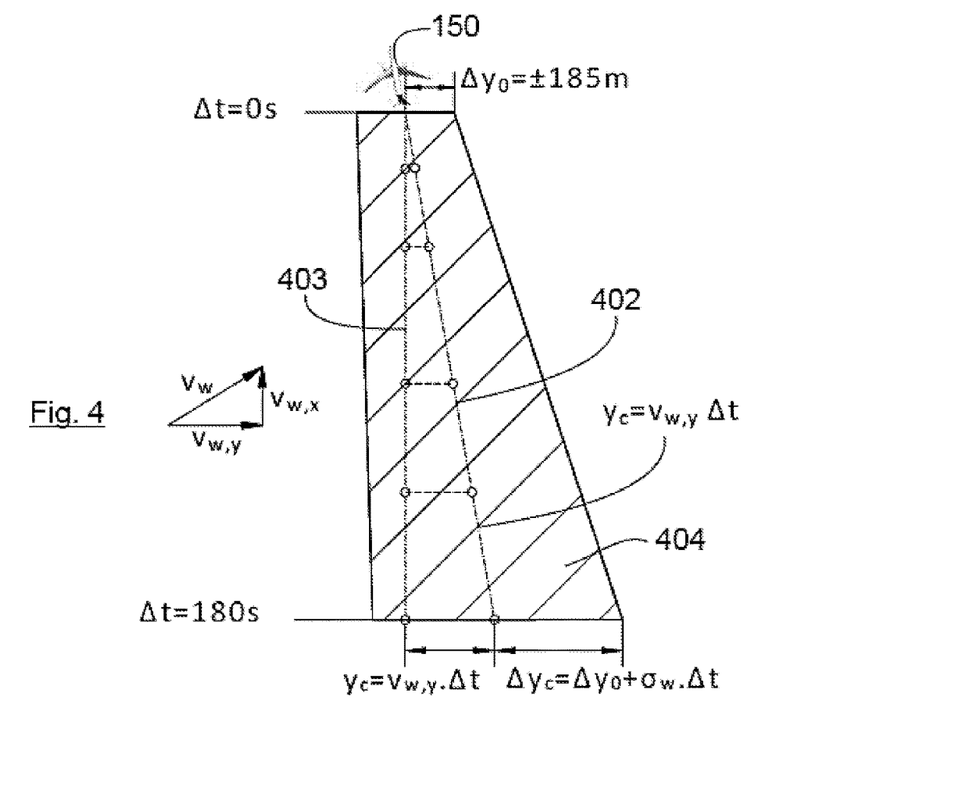
FIG. 4 is a plan view representing an estimation of the position of the wake turbulences.
Figure 5:
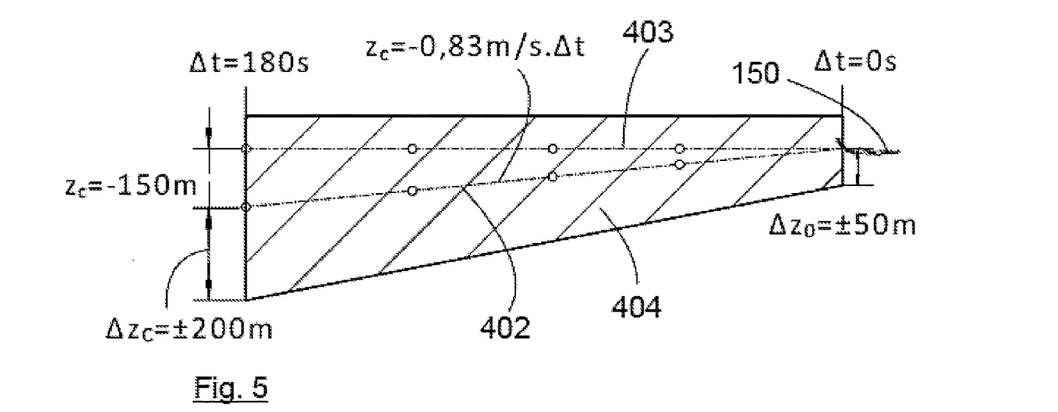
FIG. 5 is a side view representing an estimation of the position of the wake turbulences.

FIG. 4 shows a plan view of the example of the estimation of the position of the wake turbulences generated by the generating aircraft 150 and FIG. 5 shows a side view of it. Reference 402 represents the central line with respect to the trajectory of the generating aircraft 150 which is represented by the line 403. The equations of the central line 402 in a plane are given by $y_c = v_{w,y} \cdot \Delta t$ and $z_c = -0.83 \cdot \Delta t$, where $v_{w,y}$ represents the average value of the component of the wind perpendicular to the trajectory of the generating aircraft 150.

According to another embodiment, the longitudinal transport of the wake turbulence can additionally be computed as a function of the component of the wind $v_{w,x}$ parallel with the trajectory of the generating aircraft 150.

An area of proximity of the wake turbulences constructed on the basis of the above examples is the cross-hatched area 404 between $\Delta t$=0 s and $\Delta t$=180 s.

At $\Delta t$=0 s, $\Delta y_c = \Delta y_0$=±185 m and $\Delta z_c = \Delta z_0$=±50 m.

At $\Delta t$=180 s, $\Delta y_c = \Delta y_0 + 180 \cdot \sigma_w$ and $\Delta z_c$=±200 m.

For a $\Delta t$ between 0 s and 180 s, $$\Delta y_c = \Delta y_0 + \sigma_w \cdot \Delta t \text{ and } \Delta z_c = \pm\left(\Delta z_0 + \frac{150}{180} \cdot \Delta t\right).$$

The dimensions of the volume delimiting the proximity area 404 can be computed as a function of time as described above, or of the distance along the central line 402 of the wake turbulences or of the age of the wake turbulences normalized according to the characteristics of the wake turbulences.

Figure 6:
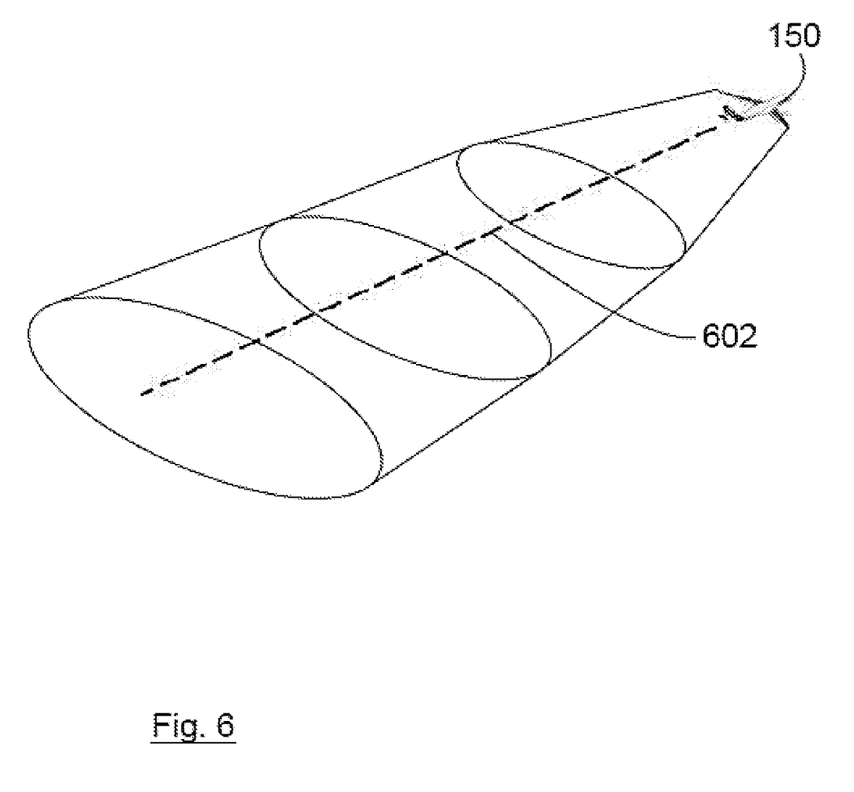
FIG. 6 is a perspective view representing an estimation of the position of the wake turbulences.

According to another embodiment, FIG. 6 shows that the uncertainty in the position of the wake turbulences can be expressed as an elliptical region around the position of estimated central line 602.

The equations mentioned above for evaluating the proximity area 404 can of course be different according to the type of the aircraft, of the generating aircraft 150, and to the conditions on the basis of which the disturbances suffered by the aircraft must be taken into account.

If the aircraft is present in the proximity area 404, the wake turbulences present in the proximity area 404 will be considered as being close and therefore taken into account for the continuation of the process and if the aircraft is outside of the proximity area 404, the wake turbulences inside the proximity area 404 will not be taken into account.

According to an embodiment, the proximity of the wake turbulences with respect to the aircraft is characterized by the lateral distance and the vertical distance of the aircraft to the central line of the wake turbulences. The wake turbulence analyzer 102 thus compares the lateral and vertical distance of the aircraft to the central line with the threshold values $\Delta y_c$ and $\Delta z_c$ calculated above and, if the distance is less than the two thresholds, this is considered as being close to a wake turbulence.

This method 300 thus makes it possible to create a report which is complete and can be used subsequently for analyzing for example the behavior of the aircraft. The method 300 used here makes it possible to identify, on the ground, the wake turbulences encountered by the aircraft. The capability of the method 300 to estimate the location of the generating aircraft 150 and the proximity of the wake turbulences generated is important because it makes it possible to validate that the turbulences that the aircraft encounters are due to a generating aircraft 150 and not to meteorological elements.

According to an embodiment, external forces and moments which are due to a disturbance of the free air flow and which act on the movements of the aircraft are taken into account in the method 300. According to an embodiment, these external forces and moments which are due to elements outside of the aircraft and which are not therefore controlled by the flight controls of the aircraft are recorded and integrated in the report.

The method 300 then comprises, after the proximity step 306 and when the aircraft has been considered as being close to at least one wake turbulence, a first computation and comparison step 310 which breaks down into or comprises a first computation sub-step 310a during which the wake turbulence analyzer 102 computes the external moments to which the aircraft is subjected, and a first comparison sub-step 310b during which the wake turbulence analyzer 102 compares these moments or a combination of these moments with threshold values.

In other words, during the first comparison sub-step 310b, the wake turbulence analyzer 102 checks if, from the point of view of the computed moments, the conditions relative to the passage through a wake turbulence are jointly met. In the positive case, the wake turbulence analyzer 102 generates the report during the generation step 308 and, in the negative case, the method 300 moves on to the stop step 320.

The first comparison sub-step 310b is in addition to the proximity comparisons, that is to say that, in this embodiment, it is necessary for both conditions to be jointly present for the passage through a turbulence to be validated and for the report to be generated.

The generation step 308 is then implemented if, in addition, the first comparison sub-step 310b is positive, as explained below, which even better validates the fact that the aircraft has encountered a wake turbulence.

As a function of an identification rule, examples of which are mentioned below, these external moments are considered as being due to wake turbulences.

According to an embodiment, only the roll and yaw moments are taken into account because these are the most critical moments when the aircraft encounters wake turbulences.

The description below gives an example of a simplified computation of the external roll moment $C_{l,ext}$ and of the external yaw moment $C_{n,ext}$, such as can be executed during the computation sub-step, where:

$$C_{l,ext} = C_{l,tot} - C_{l,control} - C_{l,damping} \text{ and}$$

$$C_{n,ext} = C_{n,tot} - C_{n,control} - C_{n,damping},$$

and where $C_{l,tot}$ is the total roll moment undergone by the aircraft, $C_{l,control}$ is the roll control moment resulting from the control surfaces of the aircraft (rudder, ailerons, spoilers . . . ), $C_{l,damping}$ is the aerodynamic roll damping moment undergone by the aircraft, $C_{n,tot}$ is the total yaw moment undergone by the aircraft, $C_{n,control}$ is the yaw control moment resulting from the control surfaces of the aircraft (rudder, ailerons, spoilers . . . ), and $C_{n,damping}$ is the aerodynamic yaw damping moment undergone by the aircraft.

The total roll moment $C_{l,tot}$ and the total yaw moment $C_{n,tot}$ can be identified on the basis of roll and yaw inertial acceleration measurements, taking the inertial equations into account in the following form:

$$C_{l,tot} = \frac{I_{xx}\dot{p} - I_{xz}\dot{r}}{q \cdot S \cdot l_{Ref}} \text{ and}$$

$$C_{n,tot} = \frac{I_{zz}\dot{r} - I_{xz}\dot{p}}{q \cdot S \cdot l_{Ref}},$$

where $I_{xx}$, $I_{zz}$, and $I_{xz}$ are the moments of inertia and they are determined from the total mass using interpolation tables, q is the dynamic pressure computed from the density of the air ρ and from the true air speed, S is the reference surface area of the wings of the aircraft, $l_{Ref}$ is the reference length of the wings of the aircraft, $\dot{p}$ is the roll acceleration determined by a navigation system of the aircraft and $\dot{r}$ is the yaw acceleration determined by the navigation system of the aircraft.

The roll control moment $C_{l,control}$ and the yaw control moment $C_{n,control}$ are expressed according to the number of control surfaces that the aircraft comprises. For example, in the case of an aircraft comprising four pairs of spoilers, one pair of ailerons, and a rudder, the moments are written as follows:

$$C_{l,control} = C_{l,\delta a} \cdot \delta a + \Sigma_{i=1}^{4} C_{l,\delta s,i} \cdot \delta s_i + C_{l,\delta r} \cdot \delta r, \text{ and}$$

$$C_{n,control} = C_{n,\delta a} \cdot \delta a + \Sigma_{i=1}^{4} C_{n,\delta s,i} \cdot \delta s_i + C_{n,\delta r} \cdot \delta r.$$

The roll damping moment $C_{l,damping}$ and the yaw damping moment $C_{n,damping}$ can be expressed on the basis of the following equations:

$$C_{l,damping} = C_{l,p} \frac{p \cdot l_{Ref}}{V_{tas}}, \text{ and}$$

$$C_{n,damping} = C_{n,\beta} \cdot \beta + C_{n,r} \frac{r \cdot l_{Ref}}{V_{tas}}.$$

In these different formulae:

$C_{l,p}$, $C_{n,\beta}$, $C_{n,r}$, $C_{l,\delta a}$, $C_{l,\delta s,i}$, $C_{l,\delta r}$, $\delta C_{l,\delta a}$, $C_{n,\delta s,i}$, $C_{n,\delta r}$ are the aerodynamic coefficients of the aircraft and of its control surfaces and they are determined as a function of the flight conditions, for example by using interpolation tables or appropriate formulae, p is the roll rate of the aircraft, r is the yaw rate of the aircraft, $V_{tas}$ is the true air speed, β is the side-slip angle of the aircraft, δa is the deflection of the ailerons of the aircraft, $\delta s_i$ is the deflection of the spoilers of the aircraft, δr is the deflection of the rudder of the aircraft, and $l_{Ref}$ is the reference length of the wings of the aircraft.

In order to use the interpolation tables some other data may also be necessary, such as for example the mass 'm' of the aircraft, the position of its center of gravity '$X_{CG}$' along the longitudinal axis of the aircraft or the speed of the aircraft through its Mach number or the calibrated air speed $V_{CAS}$.

The various values are known by construction, by calculating devices, or by sensors on board the aircraft.

According to another embodiment, it is possible also to take account of the pitch moment, the lift force, the side force, the drag force.

After the computation sub-step, the wake turbulence analyzer 102 compares the computed moments $C_{l,ext}$ and $C_{n,ext}$ with respect to threshold values, and if the computed moments are greater than the threshold values, this is considered as the fact that the aircraft has encountered a wake turbulence.

The test carried out during the first comparison sub-step 310b in order to validate the passage through a wake turbulence can take the form of various identification rules. For example, it is possible to verify that the two moments are greater than a threshold value, or that at least one of the two moments is greater than a threshold value, that a combination of the two moments is greater than a threshold value. The threshold values can be different for the roll moment ($C_{l-threshold}$) and the yaw moment ($C_{n-threshold}$). The first comparison sub-step 310b is positive if the required condition or conditions are met, in this case being greater than the threshold values.

This is represented as follows:

$$C_{l,ext} > C_{l-threshold} \text{ and } C_{n,ext} > C_{n-threshold}, \text{ or}$$

$$C_{l,ext} > C_{l-threshold} \text{ or } C_{n,ext} > C_{n-threshold}, \text{ or for example}$$

$$\sqrt{C_{l,ext}^2 + C_{n,ext}^2} > \text{Threshold}.$$

The threshold values can be fixed at values resulting from prior analyses carried out during the passage through wake turbulences.

The threshold values can be adapted dynamically according to the flight conditions, for example as a function of the mass of the aircraft, or according to the ability of the aircraft to counter the external moments to which it is subjected.

The threshold values can be adapted dynamically by analysing the values of the external roll and yaw moments over a sufficiently long time during which no wake turbulence has been encountered, to ensure that thresholds are not unduly exceeded by sufficiently high levels of background atmospheric turbulence.

The decision to validate the passage through a wake turbulence can also be made as a function of the duration during which the computed moments are greater than the thresholds. If the duration is too short, for example less than 1 sec, the disturbance will not be taken into account and is considered as being an atmospheric disturbance and, if the duration is longer, the disturbance will be validated as being a wake turbulence. The minimum duration can be a fixed item of data or it can be dependent on the speed of the aircraft and/or on the angle between the direction of flight of the aircraft and the principal axis of extension of the wake turbulence of the generating aircraft 150 or a similar factor.

According to an embodiment, the components of the wind measured at the level of the aircraft are taken into account in the method 300 and integrated in the report, this being in addition to or in replacement of the analysis of the external moments.

The method 300 then comprises, after the proximity step 306 and when the aircraft has been considered as being close to at least one wake turbulence, a second computation and comparison step 312 which breaks down into or comprises a second computation sub-step 312a during which the wake turbulence analyzer 102 retrieves the data relative to the speed of the wind around the aircraft, and computes a measurement value on the basis of these data and a second comparison sub-step 312b during which the wake turbulence analyzer 102 compares this measurement value with a threshold value.

In other words, during the second comparison sub-step 312b, the wake turbulence analyzer 102 checks if, from the point of view of the data relative to the speed of the wind, the conditions relative to the passage through a wake turbulence are met, as explained below, which amounts to checking that the measurement value is greater than a threshold value. In the positive case, the wake turbulence analyzer 102 generates the report during the generation step 308 and, in the negative case, the method 300 moves on to the stop step 320.

If the method does not comprise the first computation and comparison step 310, the second comparison sub-step 312b is in addition to the proximity comparisons, that is to say that, in this embodiment, it is necessary that the two conditions are jointly met in order for the passage through a turbulence to be validated.

If the method comprises the first computation and comparison step 310, the second computation and comparison step 312 can take place before or after the first computation and comparison step 310 (for the example shown in FIG. 3, it is after).

If the method comprises the first computation and comparison step 310, the second comparison sub-step 312b is in addition to the proximity comparisons and to the first comparison sub-step 310b, that is to say that, in this embodiment, it is necessary that the three conditions are jointly met in order for the passage through a turbulence to be validated.

The generation step 308 is then used if, in addition, the second comparison step 312b is positive as explained below, which even better validates the fact that the aircraft has encountered a wake turbulence.

After the stop step 320 and the transmission step 316, the method loops back to the position estimation step 304 in order to again identify the proximity of a wake turbulence.

As a function of an identification rule, examples of which are mentioned below, these data relative to speed are considered as being due to wake turbulences.

The data relative to the speed and to the orientation of the wind are present in the navigation systems of the aircraft which comprise appropriate sensors and can therefore be retrieved by the wake turbulence analyzer 102.

An example of computation implemented in the second computation sub-step 312a is explained below. The computation method is based on the geodesic components of the speed of the wind and which are available on board the aircraft. The components are:

$u_{wg}$: the component of the wind speed along the longitudinal axis X, generally the north,
$v_{wg}$: the component of the wind speed along the transverse axis Y, generally the east, and
$w_{wg}$: the component of the wind along the vertical axis of the wind speed Z, generally downwards.

The components are retrieved in a discrete manner by a system on the aircraft, at a frequency f which is preferably at least equal to 8 Hz.

The method comprises evaluating the variations of the components of the wind and spotting their disturbances. The spotting of these disturbances in the components makes it possible to identify the passage through a wake turbulence. The disturbances for example take the form of large variations of the components over a short time (a few seconds).

In the embodiment of the disclosure herein described, the components are combined in a measurement value with which a threshold is associated. The second comparison sub-step 312b then comprises checking if the measurement value is greater than the threshold value or not.

The measurement value here is the Turbulence Kinetic Energy (TKE), which is the average kinetic energy per unit of mass associated with a turbulent flow. The kinetic energy of the turbulence is defined as an instantaneous value, but it can be computed as an average over a period of time using a quantification by the average of the normal tensions of the turbulence.

When the kinetic energy of the turbulence is computed, several parameters can be freely adjusted, such as for example:

the width of the time window for establishing the background or mean wind,
the width of the time window for establishing the mean variances around the mean,
the number of samples or the frequency used for establishing the mean wind,
the number of samples or the frequency used for establishing the mean variances.

Typically, the same window width is used for establishing the mean wind and the mean variances, but this is not required.

The Turbulence Kinetic Energy is computed as the sum of the mean squared variations of the wind speed components about a mean wind value, computed over a given time window, the formula of which is:

$$TKE = \frac{1}{2}\left[\overline{(u'_{wg})^2} + \overline{(v'_{wg})^2} + \overline{(w'_{wg})^2}\right], \text{ where}$$

$$u'_{wg} = u_{wg} - \overline{u_{wg}}, v'_{wg} = v_{wg} - \overline{v_{wg}}, \text{ and } w'_{wg} = w_{wg} - \overline{w_{wg}}.$$

Depending on the different embodiments, it is possible to use less than three components, to express the components in a reference frame other than the geodesic reference frame, to use and combine other measurements related to the wind (angle of attack, side-slip angle, true air speed, load factors) on the aircraft.

The continuous evaluation of the measurement value (TKE in this case) makes it possible to verify if its value exceeds the threshold value representative of the passage through a wake turbulence. The threshold values can be fixed at values resulting from prior analyses carried out during the passage through wake turbulences.

The threshold value can be adapted dynamically to the medium or long term base turbulence level in order to limit incorrect detections.

The decision to validate the passage through a wake turbulence can also be made as a function of the duration during which the computed measurement value is greater than the threshold value. If the duration is too short, for example less than 1 sec, the disturbance will not be taken into account and will be considered to be an atmospheric disturbance which is not related to a wake turbulence or to be a brief signal loss or error and, if the duration is greater, the disturbance will be validated as being a wake turbulence. The minimum duration can be a fixed item of data or it can be dependent on the speed of the aircraft and/or on the angle between the direction of flight of the aircraft and the principal axis of extension of the wake turbulence of the generating aircraft or a similar factor.

The test carried out during the second comparison sub-step 312b for validating the passage through a wake turbulence then comprises checking that the measurement value is greater than the threshold value. The second comparison sub-step 312b is positive if the required condition is met, in this case the measurement value being higher than the threshold value.

According to a particular embodiment, the severity of a wake turbulence can also be taken into account in the method. The severity can be evaluated by quantifying the impact of the wake turbulences on the aircraft, such as for example an unusual attitude, a loss of altitude, a deviation with respect to the route followed, large load factors, and/or large accelerations in the cabin of the aircraft.

When a report must be generated, that is to say after the proximity step 306 and possibly the comparison sub-steps 310b and 312b have been validated, the method 300 comprises, before the generation step 308, an evaluation step 314 which comprises an evaluation sub-step 314a during which the wake turbulence analyzer 102 evaluates parameters relative to the passage through a wake turbulence.

These parameters are for example one or more of the following parameters:
 roll and pitch angles;
 maximums of the lateral and vertical load factors at the center of gravity of the aircraft or at another specific place;
 deviations with respect to the intended flight trajectory;
 exceedance of the normal aerodynamic envelope;
 structural loads;
 maximums of the external roll moments $C_{l,ext}$ or external yaw moments $C_{n,eXt}$;
 maximums of the Roll Control Ratios (RCR) (the ratio between the external roll moment and the available roll control power).

The evaluation step 314 then comprises a third comparison sub-step 314b, during which the wake turbulence analyzer 102 compares these parameters relative to the passage through a wake turbulence with respect to threshold values of these parameters which are representative of a passage through a wake turbulence sufficiently severe to be reported. The threshold values can be fixed at values resulting from prior analyses carried out during the passage through wake turbulences, including analyses of operational incidents. Only if these parameters exceed the threshold values, the third comparison sub-step 314b is positive and a report is created in the generation step 308. The parameters used for quantifying the severity of the passage are then inserted in the report during the generation step 308. In the contrary case, even if the passage through a wake turbulence is validated during the proximity step 306 and/or the comparison steps 310b and/or 312b, it is considered that it does not merit being reported and a report is not created during the generation step 308.

The report comprises the information necessary for the identification of the aircraft and the information relative to the wake turbulence encountered by the aircraft. Examples of information are listed here:
 the identification of the aircraft, its type, its serial number, the flight number, its 24-bit ICAO identifier;
 its position (longitude, latitude, altitude), the start time and the end time of the event;
 the flight conditions of the aircraft at the time of the event (autopilot status, etc.);
 the meteorological conditions at the time and at the place of the event (for example: direction and speed of the wind (longitudinal, lateral and vertical components), temperature, ambient level of atmospheric turbulences);
 the parameters relative to the event;
 the parameters relative to the severity of the event;
 the identification of the generating aircraft 150 having generated the event;
 the flight trajectory, that is to say the position as a function of time of the generating aircraft 150 before, during and after the event;
 the identification of any other aircraft present in a given radius around the aircraft;
 the maximums of the external roll $C_{l,ext}$ and yaw $C_{n,ext}$ moments;
 the maximums of the Roll Control Ratio;
 the roll and pitch angles;
 the true heading;
 the lateral and vertical load factors;
 the true air speed;
 the Turbulence Kinetic Energy (TKE);
 the lateral distance to the central line of the wake turbulence;
 the altitude relative to the central line of the wake turbulence;
 the values of the external roll moment $C_{l,ext}$ and of the external yaw moment $C_{n,ext}$.

Some of these items of information can be included in the report to be transmitted as a function of time.

Figure 7A:
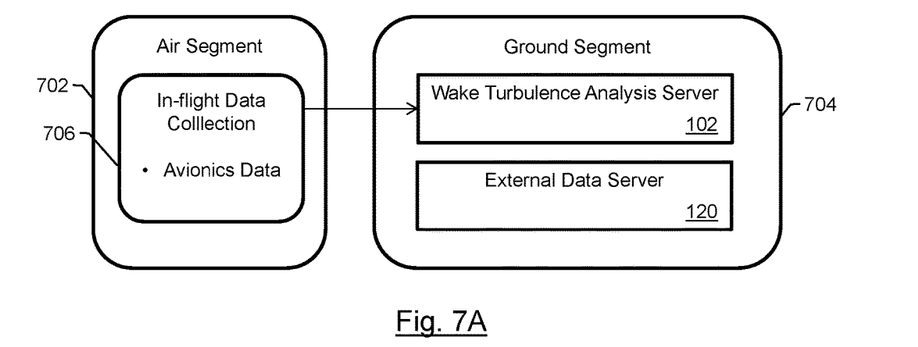
FIGS. 7A-C illustrate example air and ground environments for the wake turbulence analysis server.
Figure 7B:
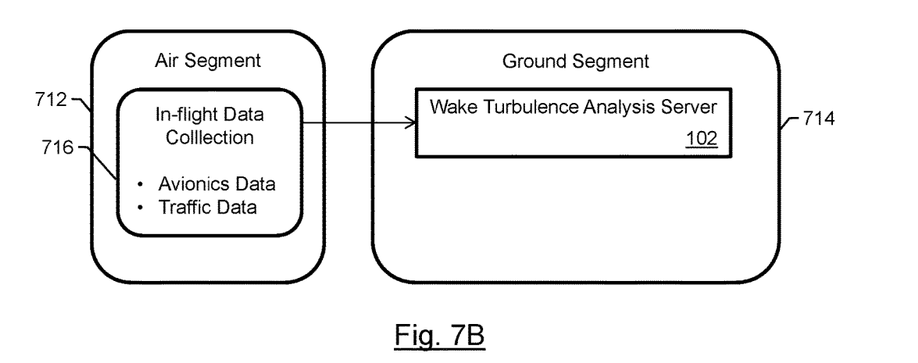
Figure 7C:
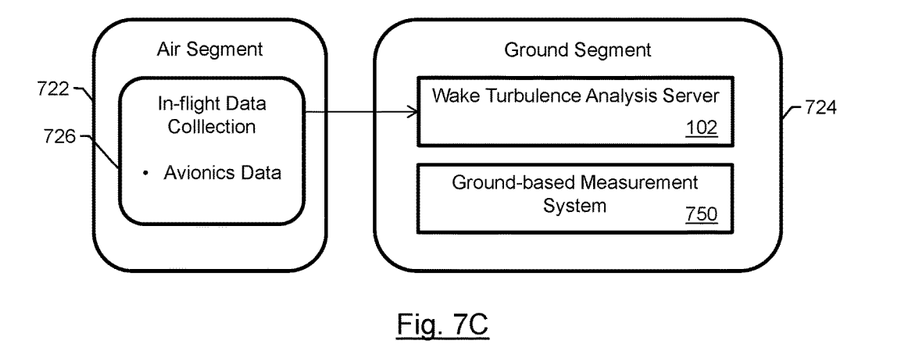

FIGS. 7A-C illustrate example air and ground environments for the wake turbulence analysis server 102. FIG. 7A shows an air segment 702 and a ground segment 704 including the wake turbulence analysis server 102. The air segment 702 is implemented by one or more aircraft that perform in-flight data collection 706 of avionics data but do not collect traffic data of other nearby aircraft (e.g., because air-to-air data link messages such as from ADS-B IN are not readily available for recording). Since the in-flight data collection 706 does not include traffic data, the wake turbulence analysis server 102 requests the traffic data from the external data server 120.

FIG. 7B shows an air segment 712 and a ground segment 714 including the wake turbulence analysis server 102. The air segment 712 is implemented by one or more aircraft that perform in-flight data collection 716 of avionics data and also collect traffic data of other nearby aircraft (e.g., being equipped with ADS-B IN). Since the in-flight data collection 716 does include traffic data, the wake turbulence analysis server 102 collects traffic data from the air segment 712 and can avoid requesting traffic data from the external data server 120.

FIG. 7C shows an air segment 722 and a ground segment 724 including the wake turbulence analysis server 102. The air segment 722 is implemented by one or more aircraft that perform in-flight data collection 726 of avionics data but do not collect traffic data of other nearby aircraft. Since the in-flight data collection 726 does not include traffic data, the wake turbulence analyzer 102 cannot compute the position of wake turbulences created by that traffic, which is required to determine the proximity to a wake turbulence of one or more of the aircraft representing the traffic. The wake turbulence analyzer 102 therefore uses a ground-based measurement system 750 to determine the locations of wake turbulences.

The ground-based measurement system 750 may be, e.g., a LIDAR sensor. The ground-based measurement system 750 may be based at an airport and limited to the area around the airport, so that measurements can be taken during final approach and take-off phases. These phases are often those in which wake turbulence encounters pose the greatest risk to aircraft. Using the ground-based measurement system 750 can provide more precise positions of the wakes.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A ground-based server for identifying a wake turbulence generated by at least one generating aircraft, the ground-based server comprising:

at least one processor and memory storing executable instructions for the at least one processor; and
a wake turbulence analyzer implemented on the at least one processor and memory and configured for:
collecting avionics data for an in-flight aircraft and traffic data for one or more other aircraft in flight at a first flight time of the in-flight aircraft;
determining that the in-flight aircraft was within a threshold distance of at least a first position of a wake turbulence estimated, using the traffic data, to be generated by a first other aircraft;
determining, after the first flight time and at the ground-based server, that the in-flight aircraft experienced at the first flight time an impact having a severity level exceeding a threshold;
determining, after the first flight time and at the ground-based server, that the in-flight aircraft experienced at the first flight time at least one of: one or more uncommanded forces and moments, and a wind signature indicative of wake turbulence; and
generating a report of a wake turbulence encounter for the in-flight aircraft at the first flight time in response to: determining that the in-flight aircraft was within the threshold distance, determining that the in-flight aircraft experienced the impact, and determining that the in-flight aircraft experienced at least one of the one or more uncommanded forces and moments and the wind signature.

2. The ground-based server of claim 1, wherein the wake turbulence analyzer is configured for collecting additional avionics data for a fleet of aircraft over a window of time and additional traffic data for the window of time and generating a plurality of wake turbulence reports for the fleet of aircraft over the window of time.

3. The ground-based server of claim 1, wherein collecting avionics data for the in-flight aircraft comprises communicating with an on-board avionics computer system of the in-flight aircraft during or after the first flight time.

4. The ground-based server of claim 1, wherein collecting the traffic data for the one or more other aircraft comprises communicating with an on-board avionics computer system of the in-flight aircraft during or after the first flight time, wherein the on-board avionics computer system is configured to record air-to-air data link messages from the one or more other aircraft when the other aircraft are within a vicinity of the in-flight aircraft.

5. The ground-based server of claim 1, wherein collecting the traffic data for the one or more other aircraft comprises requesting the traffic data from an external data server.

6. The ground-based server of claim 1, wherein determining that the in-flight aircraft was within the threshold distance of the first position of the wake turbulence comprises computing, using the traffic data, a central line of the wake turbulence of the first other aircraft and determining, using the central line, a volume in which the wake turbulences are likely to influence behavior of the in-flight aircraft.

7. The ground-based server of claim 1, wherein determining that the in-flight aircraft was within a threshold distance of a wake turbulence comprises measuring the wake turbulence using a ground-based measurement system and determining a volume in which the wake turbulences are likely to influence the behavior of the in-flight aircraft.

8. The ground-based server of claim 1, wherein determining the severity level comprises evaluating one or more of the following parameters against pre-determined values:

roll and pitch angles;

maximums of lateral and vertical load factors at a center of gravity of the in-flight aircraft or another specific place on the in-flight aircraft;

deviations with respect to an intended flight trajectory;

an aerodynamic envelope;

one or more structural loads;

maximums of external roll moments; and maximums of roll control ratios.

9. A method for identifying a wake turbulence generated by at least one generating aircraft, the method comprising:

collecting, by a wake turbulence analyzer implemented on at least one processor of a ground-based server, avionics data for an in-flight aircraft and traffic data for one or more other aircraft in flight at a first flight time of the in-flight aircraft;

determining, by the wake turbulence analyzer using the avionics data, that the in-flight aircraft was within a threshold distance of at least a first position of a wake turbulence estimated, using the traffic data, to be generated by a first other aircraft;

determining, by the wake turbulence analyzer using the avionics data, and after the first flight time, that the in-flight aircraft experienced at the first flight time an impact having a severity level exceeding a threshold;

determining, by the wake turbulence analyzer using the avionics data, and after the first flight time, that the in-flight aircraft experienced at the first flight time at least one of: one or more uncommanded forces and moments, and a wind signature indicative of wake turbulence; and generating, by the wake turbulence analyzer, a report of a wake turbulence encounter for the in-flight aircraft at the first flight time in response to: determining that the in-flight aircraft was within the threshold distance, determining that the in-flight aircraft experienced the impact, and determining that the in-flight aircraft experienced at least one of the one or more uncommanded forces and moments and the wind signature.

10. The method of claim 9, comprising collecting additional avionics data for a fleet of aircraft over a window of time and additional traffic data for the window of time and generating a plurality of wake turbulence reports for the fleet of aircraft over the window of time.

11. The method of claim 9, wherein collecting avionics data for the in-flight aircraft comprises communicating with an on-board avionics computer system of the in-flight aircraft during or after the first flight time.

12. The method of claim 9, wherein collecting the traffic data for the one or more other aircraft comprises communicating with an on-board avionics computer system of the in-flight aircraft during or after the first flight time, wherein the on-board avionics computer system is configured to record air-to-air data link messages from the one or more other aircraft when the other aircraft are within a vicinity of the in-flight aircraft.

13. The method of claim 9, wherein collecting the traffic data for the one or more other aircraft comprises requesting the traffic data from an external data server.

14. The method of claim 9, wherein determining that the in-flight aircraft was within the threshold distance the first position of the wake turbulence comprises computing, using the traffic data, a central line of the wake turbulence of the first other aircraft and determining, using the central line, a volume in which the wake turbulences are likely to influence the behavior of the in-flight aircraft.

15. The method of claim 9, wherein determining that the in-flight aircraft was within a threshold distance of a wake turbulence comprises measuring the wake turbulence using a ground-based measurement system and determining a volume in which the wake turbulences are likely to influence the behavior of the in-flight aircraft.

16. The method of claim 9, wherein determining the severity level comprises evaluating one or more of the following parameters against pre-determined values:

roll and pitch angles;

maximums of lateral and vertical load factors at a center of gravity of the in-flight aircraft or another specific place on the in-flight aircraft;

deviations with respect to an intended flight trajectory;

an aerodynamic envelope;

one or more structural loads;

maximums of external roll moments; and maximums of roll control ratios.

17. One or more non-transitory computer readable media storing instructions that, when executed by the one or more computers, cause the one or more computers to perform operations comprising:

collecting avionics data for an in-flight aircraft and traffic data for one or more other aircraft in flight at a first flight time of the in-flight aircraft;

determining that the in-flight aircraft was within a threshold distance of at least a first position of a wake turbulence estimated, using the traffic data, to be generated by a first other aircraft;

determining, after the first flight time and at a ground-based server, that the in-flight aircraft experienced at the first flight time an impact having a severity level exceeding a threshold;

determining, after the first flight time and at the ground-based server, that the in-flight aircraft experienced at the first flight time at least one of: one or more uncommanded forces and moments, and a wind signature indicative of wake turbulence; and generating a report of a wake turbulence encounter for the in-flight aircraft at the first flight time in response to: determining that the in-flight aircraft was within the threshold distance, determining that the in-flight aircraft experienced the impact, and determining that the in-flight aircraft experienced at least one of the one or more uncommanded forces and moments and the wind signature.

* * * * *